US012005655B2

(12) United States Patent
Razeghi et al.

(10) Patent No.: US 12,005,655 B2
(45) Date of Patent: Jun. 11, 2024

(54) MAIN LAMINATE

(71) Applicants: LM WIND POWER A/S, Kolding (DK); BLADE DYNAMICS LIMITED, Eastleigh Hampshire (GB)

(72) Inventors: Rama Razeghi, Eastleigh Hampshire (GB); Klavs Jespersen, Kolding (DK); Kristen Hanrahan, New Orleans, LA (US)

(73) Assignees: LM WIND POWER A/S, Kolding (DK); BLADE DYNAMICS LIMITED, Eastleigh Hampshire (GB)

( * ) Notice: Subject to any disclaimer, the term of this patent is extended or adjusted under 35 U.S.C. 154(b) by 47 days.

(21) Appl. No.: 17/801,363

(22) PCT Filed: Apr. 7, 2020

(86) PCT No.: PCT/EP2020/059844
§ 371 (c)(1),
(2) Date: Aug. 22, 2022

(87) PCT Pub. No.: WO2021/204357
PCT Pub. Date: Oct. 14, 2021

(65) Prior Publication Data
US 2023/0071090 A1    Mar. 9, 2023

(51) Int. Cl.
*B29C 70/52*    (2006.01)
*B29C 70/42*    (2006.01)
(Continued)

(52) U.S. Cl.
CPC ............. *B29C 70/52* (2013.01); *B29C 70/42* (2013.01); *F03D 1/0633* (2013.01);
(Continued)

(58) Field of Classification Search
CPC ................. F03D 1/0675; F03D 1/0679; F05B 2280/6003; B29C 70/42; B29C 70/52; B29L 2031/085
See application file for complete search history.

(56) References Cited

U.S. PATENT DOCUMENTS

| 10,465,653 | B2 * | 11/2019 | Livingston | .............. B29C 70/52 |
| 11,486,350 | B2 * | 11/2022 | Jespersen | .............. F03D 1/0675 |
| 2016/0160837 | A1 * | 6/2016 | Geiger | .............. B29D 99/0028 29/889.71 |

FOREIGN PATENT DOCUMENTS

| EP | 2778393 A2 | 9/2014 |
| EP | 3418556 A1 | 12/2018 |

(Continued)

*Primary Examiner* — Topaz L. Elliott
*Assistant Examiner* — Jason G Davis
(74) *Attorney, Agent, or Firm* — Nath, Goldberg & Meyer; Jerald L. Meyer; Tanya E. Harkins

(57) ABSTRACT

A main laminate forming a load carrying structure for a wind turbine blade, the main laminate extending in a spanwise direction from a proximal end through a transition region to a distal end, wherein the main laminate comprises:
 a top side, a bottom side, and a thickness direction extending between the top side and the bottom side;
 a pultrusion portion including a bottom pultrusion element extending to a transition end of a transition portion located in the transition region of the main laminate;
 a plurality of stacked fibre-reinforced elements including bottom and top fibre-reinforced elements extending to a transition end of a transition portion located in the transition region,
wherein the pultrusion portion and the plurality of fibre-reinforced elements are connected by a joint in the transition region of the main laminate.

14 Claims, 6 Drawing Sheets

(51) Int. Cl.
 B29L 31/08 (2006.01)
 F03D 1/06 (2006.01)
 B29K 307/04 (2006.01)
 B29K 309/08 (2006.01)

(52) U.S. Cl.
 CPC ......... F03D 1/0658 (2013.01); F03D 1/0675 (2013.01); F03D 1/0679 (2023.08); B29K 2307/04 (2013.01); B29K 2309/08 (2013.01); B29L 2031/085 (2013.01); F05B 2280/6003 (2013.01)

(56) References Cited

FOREIGN PATENT DOCUMENTS

| WO | 2019238606 A1 | 12/2019 |
| WO | 2020086080 A1 | 4/2020 |
| WO | 2020201120 A1 | 10/2020 |

* cited by examiner

MAIN LAMINATE

This is a National Phase Application filed under 35 U.S.C. 371 as a national stage of PCT/EP2020/059844, filed Apr. 7, 2020, the content of each of which is hereby incorporated by reference in its entirety.

TECHNICAL FIELD

The present disclosure relates to a main laminate for a wind turbine blade and a method of manufacturing such a main laminate.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two moulds. Afterwards, one of the two halves is turned upside down and positioned on top of the other of the two halves, and the two halves are adhered together. The blade parts may be positioned on top of each other by turning and repositioning the complete half mould.

A wind turbine blade and/or components of the wind turbine blade, such as webs and/or shells, may be manufactured by infusing fibres, such as glass fibre mats and/or carbon fibre mats with a resin, such as polyester or epoxy. Infusion of the fibres may be provided by vacuum assisted resin transfer moulding (VARTM).

Components of the blade have different function, e.g. a main laminate or spar cap provides the load carrying capability of the blade and the shell or skin provides the outer aerodynamic shape of the blade. Recent developments of main laminates have introduced, typically prefabricated, pultrusion elements which are reliable in strength and weight.

As wind turbines and wind turbine blades increase in size, the blade loads, i.e. strains, bending moments, peel loads etc., difficulty in manufacturing, increase. For this and other reasons, blades are sometimes divided into two or more segments connected via a joint which requires space to adequately transfer loads between the segments.

SUMMARY

On this background, it may be seen as an object of the present disclosure to provide an improved main laminate for a wind turbine blade which is reliable in weight and strength while being flexible and a method for manufacturing such a main laminate.

One or more of these objects may be met by aspects of the present disclosure as described in the following.

A first aspect of this disclosure relates to a main laminate forming a load carrying structure for a wind turbine blade, the main laminate extending in a spanwise direction from a proximal end through a transition region to a distal end, wherein the main laminate comprises:
- a top side configured for facing the interior of the wind turbine blade, a bottom side opposite of the top side, and a thickness direction extending between the top side and the bottom side;
- a pultrusion portion including a bottom pultrusion element extending in the spanwise direction from the proximal end to a transition end located in the transition region of the main laminate, the pultrusion portion having a transition portion at the transition end, the bottom pultrusion element forming a first part of the bottom side of the main laminate;
- a plurality of fibre-reinforced elements including bottom and top fibre-reinforced elements extending in the spanwise direction from the distal end to a transition end located in the transition region of the main laminate, the plurality of fibre-reinforced elements having a transition portion at the transition end, the bottom fibre-reinforced element forming a second part of the bottom side of the main laminate, the plurality of fibre-reinforced elements being stacked in the thickness direction from the bottom fibre-reinforced element to the top fibre-reinforced element;

wherein the transition portion of the pultrusion portion and the transition portion of the plurality of fibre-reinforced elements are connected by a joint in the transition region of the main laminate.

By providing such a main laminate, advantages of pultrusion elements and fibre-reinforced elements may be combined. Pultrusion elements have the advantages of being reliable in strength and weight and easy to mass produce. However, as pultrusion elements typically have a one-dimensional shape, i.e. with a constant cross section along the length of the pultrusion element, the pultrusion portion may be over dimensioned at certain locations along the spanwise direction to ensure a desired strength is achieved. In order to increase the design flexibility, the pultrusion elements are combined with fibre-reinforced elements, such as fibre sheets or preform elements, as the cross-section of the fibre-reinforced elements can be tailored to achieve the desired strength at a given location.

A main laminate may also be known as a spar cap.

Additionally or alternatively, the transition portion of the pultrusion portion and the transition portion of the plurality of fibre-reinforced elements may be connected by a joint in the transition region of the main laminate.

Additionally or alternatively, the bottom side may be configured for facing a shell or skin of the wind turbine blade.

Additionally or alternatively, the shell or skin defines the outer aerodynamic profile of the wind turbine blade.

Additionally or alternatively, the top fibre-reinforced element forming part of the top side of the main laminate.

Additionally or alternatively, the plurality of fibre-reinforced elements may be in the form of at least one fibre-reinforced sheet, at least one fibre-reinforced ply, and/or at least one fibre-reinforced preform element. The plurality of fibre-reinforced elements may comprise carbon fibre and/or glass fibres.

A preform element may have the advantage of allowing configuring the shape of the preform element prior to the connection with the pultrusion elements since and a preform element retains its shape prior to curing, in contrast to fibre sheets or plies. A fibre-reinforced sheet or ply may have the advantage of being cheaper and having more control over the fibre direction in the in resulting main laminate.

Additionally or alternatively, the fibres of the fibre-reinforced elements may comprise carbon fibres and/or glass fibres.

Additionally or alternatively, the fibres may be arranged unidirectional, woven, or braided.

Additionally or alternatively, the bottom and/or top fibre-reinforced element may be in the form of a fibre-reinforced sheet or fibre-reinforced ply, and/or a fibre-reinforced preform element.

In this disclosure, the term "preform element" may be defined as a fibre-reinforced element comprising a binder, such as a wax, which turns soft when heated and stiffens at room temperature. The binder is different from a resin or matrix for curing the element as curing is typically irreversible. The binder increases shape stability of the uncured preform element compared to an uncured fibre-reinforced element without a binder. The preform element may be cured with a resin or matrix material along with the remaining elements of the main laminate. The binder of the preform element may thus typically be present in the cured preform element.

Additionally or alternatively, the plurality of fibre-reinforced elements may be a plurality of fibre-reinforced non-pultruded elements.

Additionally or alternatively, the bottom pultrusion element and/or the plurality of pultrusion elements are cured pultrusion elements.

Additionally or alternatively, the plurality of fibre-reinforced elements is a plurality of cured fibre-reinforced elements.

Additionally or alternatively, the pultrusion portion may comprise a top pultrusion element forming part of the top side of the main laminate, the pultrusion elements being stacked in the thickness direction from the bottom pultrusion element to the top pultrusion element.

This may provide the advantage of increasing the flexibility of the pultrusion portion as the strength at a given location along the spanwise direction may be configured by stacking more or less pultrusion elements at that location, e.g. more pultrusion elements may be stacked at the proximal end than adjacent to the transition region which is typically desired when the proximal end of the main laminate is configured for being located in a root region of a wind turbine blade.

Additionally or alternatively, the pultrusion portion may include at least three, four, five, or more intermediate pultrusion elements arranged between the bottom pultrusion element and the top pultrusion element.

Additionally or alternatively, the pultrusion portion may comprise at least one fibre sheet separating adjacent stacked pultrusion elements.

Additionally or alternatively, one or more, optionally all, of the pultrusion elements may be a pultrusion beam or pultrusion beams.

Additionally or alternatively, the cross section of each individual pultrusion element, e.g. each pultrusion beam, of the pultrusion portion may be constant along a majority of the spanwise extent, optionally until the transition region.

Additionally or alternatively, the bottom pultrusion element may be a first bottom pultrusion element, and wherein the pultrusion portion may comprise a second bottom pultrusion element arranged side-by-side chordwise with the first bottom pultrusion element.

This may provide the advantage of increasing the flexibility of the pultrusion portion as the strength at a given location along the spanwise direction may be configured by arranging more or less pultrusion elements side-by-side at that location, e.g. more pultrusion elements may be arranged side-by-side at the proximal end than adjacent to the transition region which is typically desired when the proximal end of the main laminate is configured for being located in a root region of a wind turbine blade.

Additionally or alternatively, the pultrusion portion may include at least three, four, five, or more intermediate pultrusion elements arranged between the first bottom pultrusion element and the second bottom pultrusion element.

Additionally or alternatively, the bottom pultrusion element may be a distal bottom pultrusion element, and wherein the pultrusion portion may comprise a proximal bottom pultrusion element arranged end-to-end and in extension of the distal bottom pultrusion element.

This may provide the advantage that the absolute length of each pultrusion element may be reduced which is especially an advantage for main laminate configured for a long wind turbine blade, e.g. with a blade length of more than 50, 60, 70, 80, or 90 meters.

Additionally or alternatively, the pultrusion portion may include at least three, four, five, or more intermediate pultrusion elements arranged between the distal bottom pultrusion element and the proximal bottom pultrusion element.

Additionally or alternatively, the joint may be a scarf joint, preferably a single scarf joint.

A taper joint may a particular suitable joint for such a main laminate as it is simple to lay up and provides good stress transfer particularly in the spanwise direction.

Additionally or alternatively, the scarf joint may be a spanwise scarf joint, optionally a spanwise single scarf joint.

Additionally or alternatively, the pultrusion portion and the plurality of fibre-reinforced elements may overlap, optionally in the spanwise direction.

Additionally or alternatively, the bottom pultrusion element and the top fibre-reinforced element may overlap, optionally in the spanwise direction.

Additionally or alternatively, the transition portion of the pultrusion portion may spanwise taper off from the bottom side to the top side of the pultrusion portion, i.e. so the bottom side of the pultrusion portion is longer than the top side of the pultrusion portion in the transition region, and wherein the transition portion of the plurality of fibre-reinforced elements may correspondingly spanwise taper off from the top side of the plurality of fibre-reinforced elements to the bottom side of the plurality of fibre-reinforced elements, i.e. so that the top side of the plurality of fibre reinforced elements are longer than the bottom side of the plurality of fibre-reinforced elements in the transition region, wherein the first and transition portions may thereby form a spanwise scarf joint.

Additionally or alternatively, a chordwise side of the transition portion of the pultrusion portion and a chordwise side of the transition portion of the plurality of fibre-reinforced elements may be connected by a joint, preferably a scarf joint.

A chordwise joint may increase the stress transfer to provide an overall stronger joint.

Additionally or alternatively, a first chordwise tapering portion or bevelled portion of the transition portion of the pultrusion portion and a corresponding second chordwise tapering portion of the transition portion of the plurality of fibre-reinforced elements may be connected by a joint, preferably a scarf joint.

Additionally or alternatively, the main laminate may comprise first, second, third, fourth, fifth, and sixth locations located along the spanwise extent of the main laminate, the first location being located at the proximal end of the main laminate and the sixth location being located at the distal end of the main laminate, the transition region of the main laminate being bounded by the second location and the fifth location, wherein the transition end of the pultrusion portion is located at the third location and an opposite end of the pultrusion portion is located at the first location, the second location is located between the first and third locations, and wherein the transition end of the plurality of fibre-reinforced elements is located at the fourth location, and an opposite end of the plurality of fibre-reinforced elements may be located at the sixth location, the fifth location is located between the fourth and sixth locations.

Additionally or alternatively, the main laminate may comprise first, second, third, fourth, fifth, and sixth spanwise locations. The first location may be located at the proximal end of the main laminate and the sixth location may be located at the distal end of the main laminate. The transition region may be bounded by the second location and the fifth location.

Additionally or alternatively, the transition end of the pultrusion portion may be located at the third location, and an opposite end of the pultrusion portion may be located at the first location. The second location may be located between the first and third locations. The second location may define a first boundary of the transition region.

Additionally or alternatively, the transition end of the plurality of fibre-reinforced elements may be located at the fourth location, and an opposite end of the plurality of fibre-reinforced elements may be located at the sixth location. The fifth location may be located between the fourth and sixth locations. The fifth location may define a second boundary of the transition region.

Additionally or alternatively, the second location may be located at the fourth location, and/or the fifth location may be located at the third location.

Additionally or alternatively, the second location may be located between the first and fourth location, and/or the fifth location may be located between the third and sixth location.

Additionally or alternatively, a thickness of the pultrusion portion in the thickness direction adjacent to the transition region, optionally at the third location of the main laminate, may be thicker than a thickness of the plurality of fibre-reinforced elements in the thickness direction adjacent to the transition region, optionally at the fifth location of the main laminate and/or a maximum thickness of the plurality of fibre-reinforced elements.

This may provide the advantage that, when the main laminate forms part of a wind turbine blade, additional interior space above the main laminate is freed to be used by other components of the wind turbine blade. This is particularly an advantage when the wind turbine blade is segmented so additional space is available for the joint between segments.

Additionally or alternatively, a chordwise width of the plurality of fibre-reinforced elements adjacent to the transition region, optionally at the fifth location of main laminate, may be wider than a chordwise width of the pultrusion portion in the chordwise direction adjacent to the transition region, optionally at the third location of the main laminate.

This may provide the advantage, that the strength of the main laminate can be better tailored to the desired characteristics at the plurality of fibre-reinforced elements adjacent to the transition region and at the pultrusion elements adjacent to the transition region.

Additionally or alternatively, the pultrusion elements may have substantially the same, preferably chordwise, cross-section.

Additionally or alternatively, the chordwise cross-sectional area of the pultrusion portion adjacent to the transition region, optionally at a third location of the main laminate, may be within ±20%, ±10%, ±5%, ±2%, or ±1% in relation to the chordwise cross-sectional area of the plurality of fibre-reinforced elements adjacent to the transition region, optionally at a fifth location of the main laminate.

Additionally or alternatively, this disclosure also relates to a wind turbine blade extending along a longitudinal axis from a root to a tip, the wind turbine blade comprising a root region and an airfoil region with the tip, the wind turbine blade comprising a pressure side, a suction side, and a chord line extending between a leading edge and a trailing edge, the wind turbine blade comprising a shell providing the aerodynamic shape of the wind turbine blade and a main laminate according to the first aspect, the main laminate forming a load carrying structure of the wind turbine blade and the bottom side of the main laminate is positioned on the shell.

Additionally or alternatively, the proximal end of the main laminate may be located in the root region or at the root of the wind turbine blade and the distal end of the main laminate is located in the airfoil region or at the tip of the wind turbine blade, and wherein the transition region of the main laminate may be located in the airfoil region of the wind turbine blade.

Additionally or alternatively, this disclosure also relates to a wind turbine blade segment for a wind turbine blade according to the second aspect, the wind turbine blade segment extending along a longitudinal axis from a root to a distal end configured for connection with another wind turbine blade segment, the wind turbine blade segment comprising a root region and an airfoil region with the distal end, the wind turbine blade comprising a pressure side, a suction side and a chord line extending between a leading edge and a trailing edge, the wind turbine blade segment comprising a shell defining the aerodynamic shape of the wind turbine blade segment and a main laminate according to the first aspect, the main laminate forming a load carrying structure of the wind turbine blade segment and the bottom side of the main laminate is positioned on the shell.

Additionally or alternatively, the proximal end of the main laminate may be located in the root region or at the root of the wind turbine blade segment and the distal end of the main laminate may be located in airfoil region or at the distal end of the wind turbine blade segment, and wherein the transition region of the main laminate is located in the airfoil region of the wind turbine blade segment.

Additionally or alternatively, the distal end may be configured for connection with another wind turbine segment, e.g. a tip segment including the tip of the wind turbine blade, optionally by a pin joint. In this case it is particularly advantageous to use the main laminate according to the first aspect, since the plurality of fibre-reinforced elements allows widening the load-carrying structure at the pin joint and thereby increase the height available for the pin joint.

Additionally or alternatively, this disclosure also relates to a wind turbine blade comprising a wind turbine blade segment as previously described and a wind turbine tip blade segment connected with each other by a pin joint. The wind turbine blade segments may be separately provided.

Additionally or alternatively, a wind turbine may comprise the wind turbine blade or the wind turbine blade segment.

A second aspect of this disclosure relates to a method for manufacturing a main laminate for a wind turbine blade, the main laminate extending in a spanwise direction from a proximal end through a transition region to a distal end and comprising a bottom side configured for facing a shell of the wind turbine blade, a top side configured for facing the interior of the wind turbine blade, and a thickness direction extending between the bottom side and the top side, the method comprising the steps of:

providing:

a pultrusion portion including a bottom pultrusion element extending in the spanwise direction to a transition end, the pultrusion portion having a transition portion at the transition end, and a plurality of fibre-reinforced elements including bottom and top fibre-reinforced elements extending in the spanwise direction to a transition end, the plurality of fibre-reinforced elements having a transition portion at the transition end;

positioning the bottom pultrusion element and the bottom fibre-reinforced element in extension of each other, so that the transition end of bottom fibre-reinforced element is adjacent to and faces the transition end of the bottom pultrusion element;

stacking the plurality of fibre-reinforced elements in the thickness direction from the bottom fibre-reinforced element to the top fibre-reinforced element;

curing the pultrusion portion and the plurality of fibre-reinforced elements thereby forming a joint between the transition portion of the pultrusion portion and the transition portion of the plurality of fibre-reinforced elements.

The second aspect of this disclosure also relates to a method for manufacturing a wind turbine blade extending along a longitudinal axis from a root to a tip, the wind turbine blade comprising a root region and an airfoil region with the tip, the wind turbine blade comprising a pressure side, a suction side and a chord line extending between a leading edge and a trailing edge, the wind turbine blade comprising a shell providing the aerodynamic shape of the wind turbine blade and a main laminate forming a load carrying structure of the wind turbine blade, the method comprising the steps of:

providing:
a shell configured for providing the aerodynamic shape of the wind turbine blade,
a pultrusion portion including a bottom pultrusion element extending in the spanwise direction to a transition end, the pultrusion portion having a transition portion at the transition end, and
a plurality of fibre-reinforced elements including bottom and top fibre-reinforced elements extending in the spanwise direction to a transition end, the plurality of fibre-reinforced elements having a transition portion at the transition end;

positioning the bottom pultrusion element and the bottom fibre-reinforced element in extension of each other on the shell of the wind turbine blade, so that the transition end of bottom fibre-reinforced element is adjacent to and faces the transition end of the bottom pultrusion element;

stacking the plurality of fibre-reinforced elements in the thickness direction from the bottom fibre-reinforced element to the top fibre-reinforced element so that the transition end of the pultrusion portion is positioned adjacent to the transition end of the plurality of fibre-reinforced elements; and curing the pultrusion portion and the plurality of fibre-reinforced elements thereby forming a joint between the transition portion of the pultrusion portion and the transition portion of the plurality of fibre-reinforced elements.

By providing such a method of manufacturing a main laminate or a wind turbine blade with a main laminate, advantages of pultrusion elements and fibre-reinforced elements may be combined. Pultrusion elements have the advantages of being reliable in strength and weight and easy to mass produce. However, as pultrusion elements typically have a one-dimensional shape, i.e. with a constant cross section along the length of the pultrusion element, the pultrusion portion may be over dimensioned at certain locations along the spanwise direction to ensure a desired strength is achieved. In order to increase the design flexibility, the pultrusion elements are combined with fibre-reinforced elements, such as fibre sheets or preform elements, as the cross-section of the fibre-reinforced elements can be tailored to achieve the desired strength at a given location.

Additionally or alternatively, the first and transition portions are joined end-to-end optionally in a spanwise scarf joint.

Additionally or alternatively, the step of positioning the bottom pultrusion element and the bottom fibre-reinforced element in extension of each other on the shell of the wind turbine blade may thereby form a continuous bottom side of the pultrusion portion and the plurality of fibre-reinforced elements.

Additionally or alternatively, the shell may form part of a wind turbine blade segment extending from a root end to a joint end, the method may further comprise:

joining via a pin joint, a joint end of the wind turbine blade segment with a joint end of a distal segment optionally extending to a tip end, which may form the tip of the wind turbine blade.

Additionally or alternatively, the pultrusion portion may be a plurality of pultrusion elements including the bottom pultrusion element and a top pultrusion element, the plurality of pultrusion elements extending in the spanwise direction to the transition end of the pultrusion portion, and wherein the step of positioning the pultrusion portion may comprise:

stacking the plurality of pultrusion elements in the thickness direction from the bottom pultrusion element to the top pultrusion element so that the transition end of the pultrusion portion is positioned adjacent to the transition end of the plurality of fibre-reinforced elements.

Additionally or alternatively, the method according to the second aspect may further comprise one or more of the steps of:

sealing the pultrusion portion and the plurality of fibre-reinforced elements in an airtight cavity, and/or
evacuating air from the cavity to create a low-pressure atmosphere in the cavity, and/or
infusing the pultrusion portion and the plurality of fibre-reinforced elements with a resin or matrix material.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of the invention will be described in more detail in the following with regard to the accompanying figures. Like reference numerals refer to like elements throughout. Like elements may, thus, not be described in detail with respect to the description of each figure. The figures show one way of implementing the present invention and are not to be construed as being limiting to other possible embodiments falling within the scope of the attached claim set. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

DETAILED DESCRIPTION OF THE INVENTION

In the following figure description, the same reference numbers refer to the same elements and may thus not be described in relation to all figures.

Figure 1:
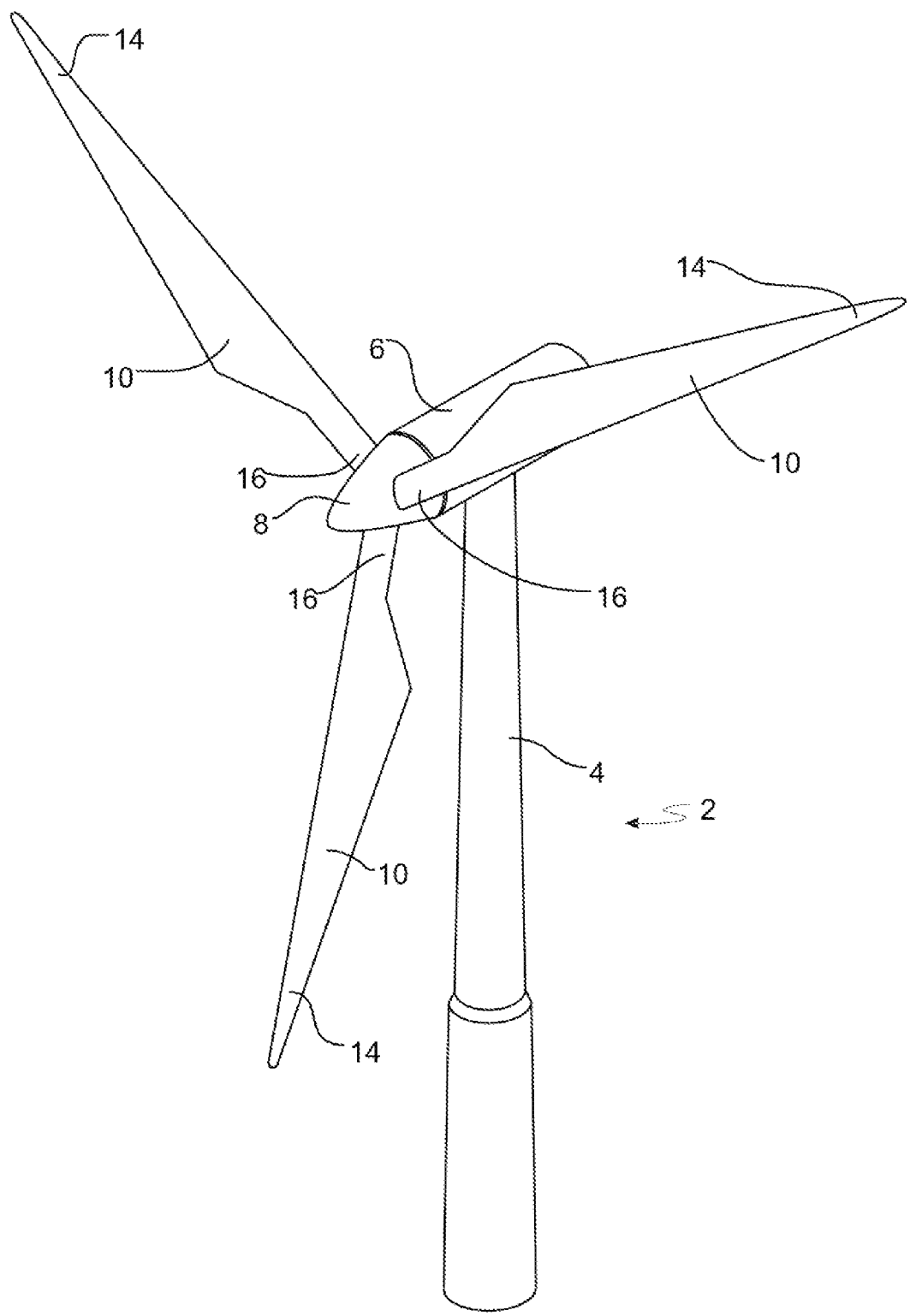
FIG. 1 is a schematic diagram illustrating a perspective view of an exemplary wind turbine.

FIG. 1 illustrates a conventional modern upwind wind turbine 2 according to the so-called "Danish concept" with a tower 4, a nacelle 6 and a rotor with a substantially horizontal rotor shaft which may include a tilt angle of a few degrees. The rotor includes a hub 8 and three blades 10 extending radially from the hub 8, each having a blade root 16 nearest the hub and a blade tip 14 furthest from the hub 8.

Figure 2:
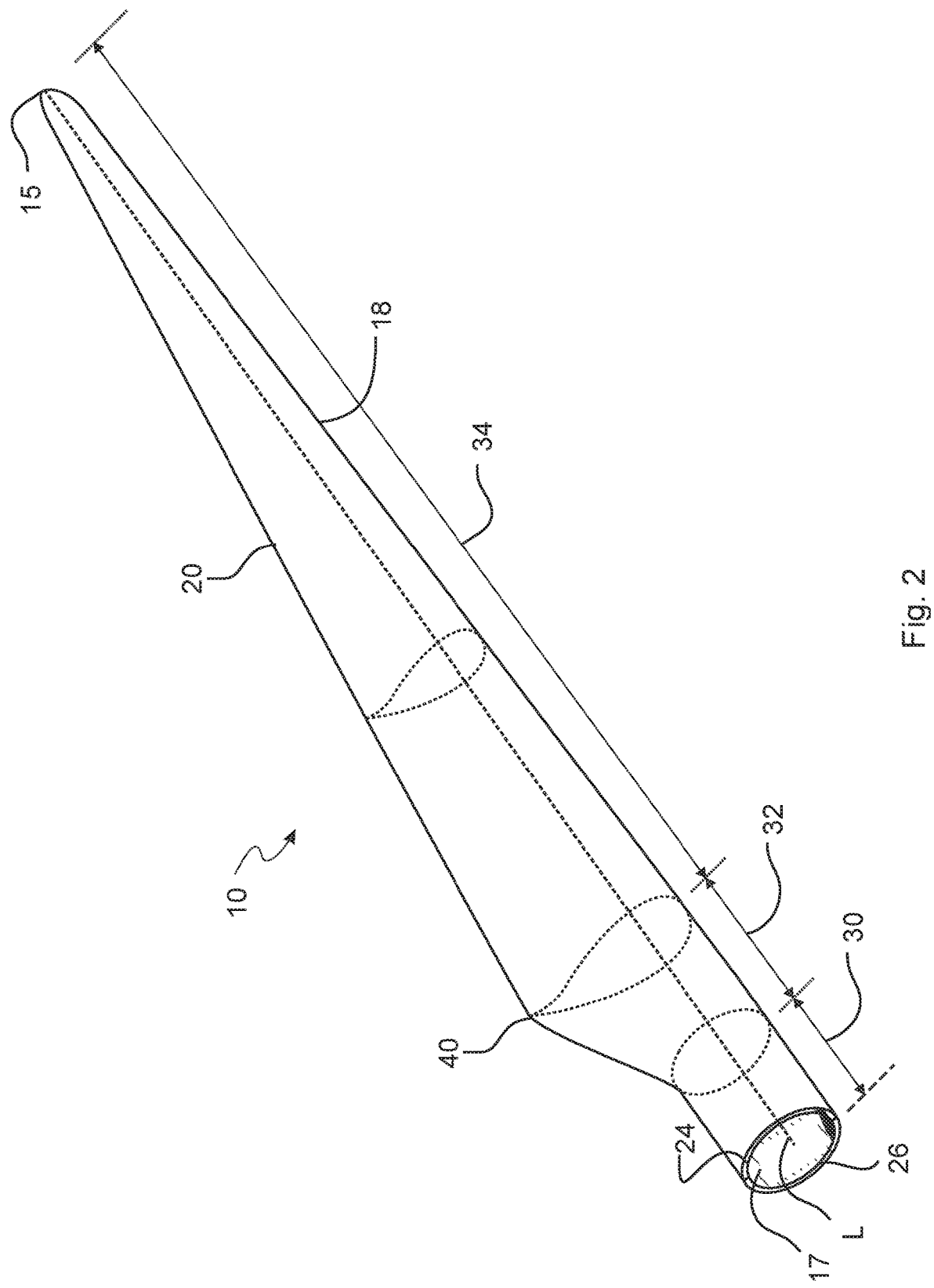
FIG. 2 is a schematic diagram illustrating a perspective view of an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape. The blade shell parts 24, 26 define the aerodynamic shape of the wind turbine blade but require a main laminate to have the load carrying structure to support the weight of the wind turbine blade.

Figure 3:
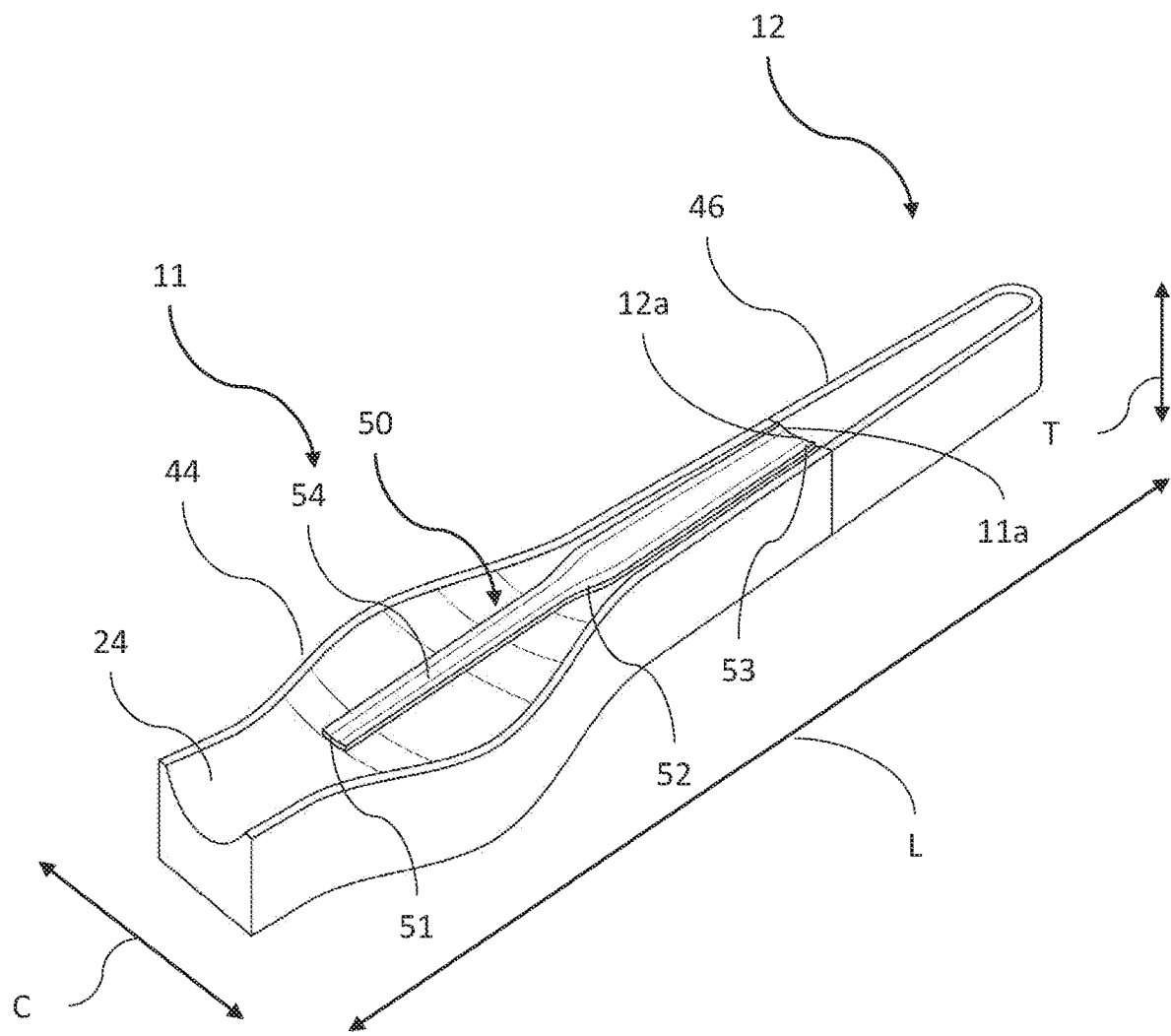
FIG. 3 is a schematic diagram illustrating a perspective view of an exemplary wind turbine blade shell segment with a main laminate.

FIG. 3 shows a schematic view of a proximal and a distal mould 44, 46 for a first blade half shell part 24 of root and tip blade segments 11, 12, respectively, arranged end-to-end at a respective joint end 11a, 12a. A root blade shell part 24 is positioned on a mould surface of the proximal mould 11. A main laminate 50 is positioned on the blade shell part 24 and 50 is configured for forming the load carrying structure of the root blade segment 11 together with a corresponding second main laminate on a second blade shell part (not shown). The main laminates are intended to be connected via webs (not shown). The main laminate 50 extends in a spanwise direction L from a proximal end 51 through a transition region 52 to a distal end 53. The proximal end 51 of the main laminate 50 is located in the root region 30 of the root of the wind turbine blade and the distal end 53 of the main laminate 50 is located in the airfoil region 34 of the wind turbine blade 10. The transition region 52 of the main laminate 50 is located in the airfoil region 34 of the wind turbine blade 10.

Different specific configurations of the main laminate are described in more detail in FIGS. 4-6. However generally, the main laminate 50 comprises a top side 54 configured for facing the interior of the wind turbine blade, a bottom side 55 opposite of the top side 54, and a thickness direction T extending between the top side 54 and the bottom side 55.

The main laminate further comprises a pultrusion portion 60 including a bottom pultrusion element 61 extending in the spanwise direction L from the proximal end 51 to a transition end 60a located in the transition region 52 of the main laminate 50. The pultrusion portion 60 has a transition portion 60b at the transition end 60a and the bottom pultrusion element 61 forms part of the bottom side 55 of the main laminate 50, see FIG. 5a-5b.

The main laminate further comprises a plurality of fibre-reinforced elements 70 including bottom and top fibre-reinforced elements 71, 72 extending in the spanwise direction L from the distal end 53 to a transition end 70a located in the transition region 52 of the main laminate 50. The plurality of fibre-reinforced elements 70 has a transition portion 70b at the transition end 70a. The bottom fibre-reinforced element 71 forms part of the bottom side 55 of the main laminate 50, see FIG. 5a-5b. The plurality of fibre-reinforced elements 71, 72 are stacked in the thickness direction T from the bottom fibre-reinforced element 71 to the top fibre-reinforced element 72, see FIG. 5a-5b.

The transition portion 60b of the pultrusion portion 60 and the transition portion 70b of the plurality of fibre-reinforced elements 70 are connected by a joint 80, 81, 82 in the transition region 52 of the main laminate 50, see FIGS. 5a-6b.

The pultrusion elements 61, 62, 63, 64, 65, 66 are pultrusion beam and those who form part of a scarf joint 81, 82, 83 are cut with a tapering transition end 60a.

The plurality of fibre-reinforced elements 70 is a combination of non-pultruded preform elements and non-pultruded unidirectional sheets reinforced with carbon and glass fibres.

Figure 4A:
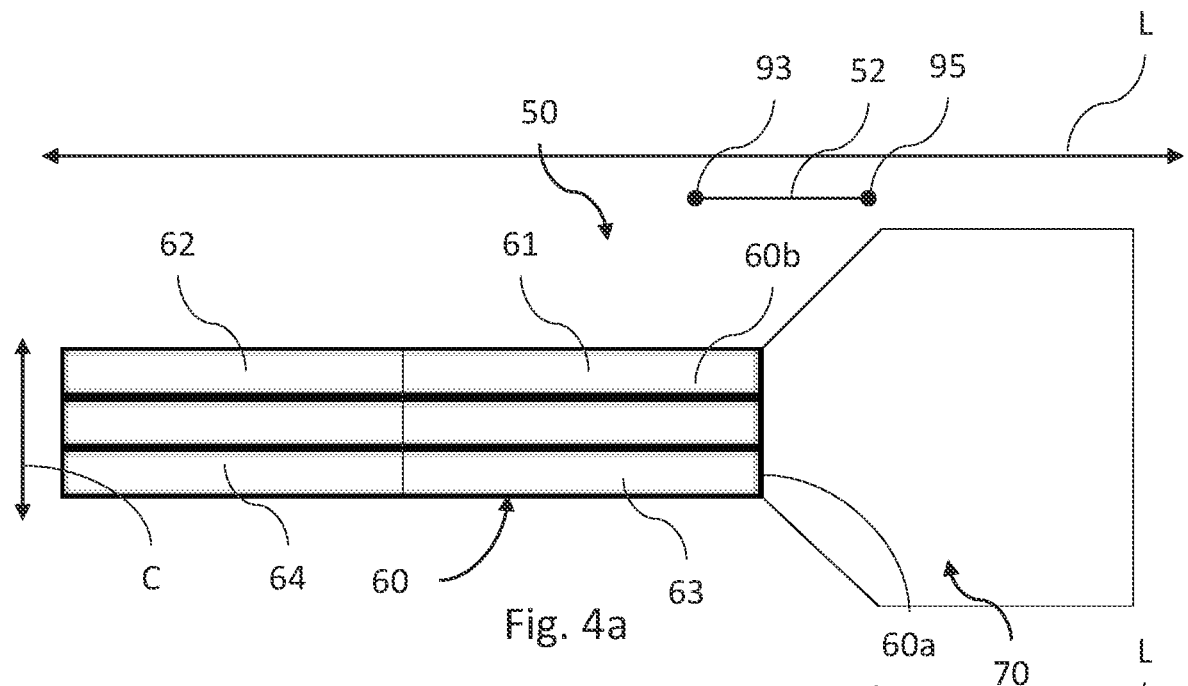
FIG. 4a is a schematic diagram illustrating a top view of an exemplary main laminate.
Figure 4B:
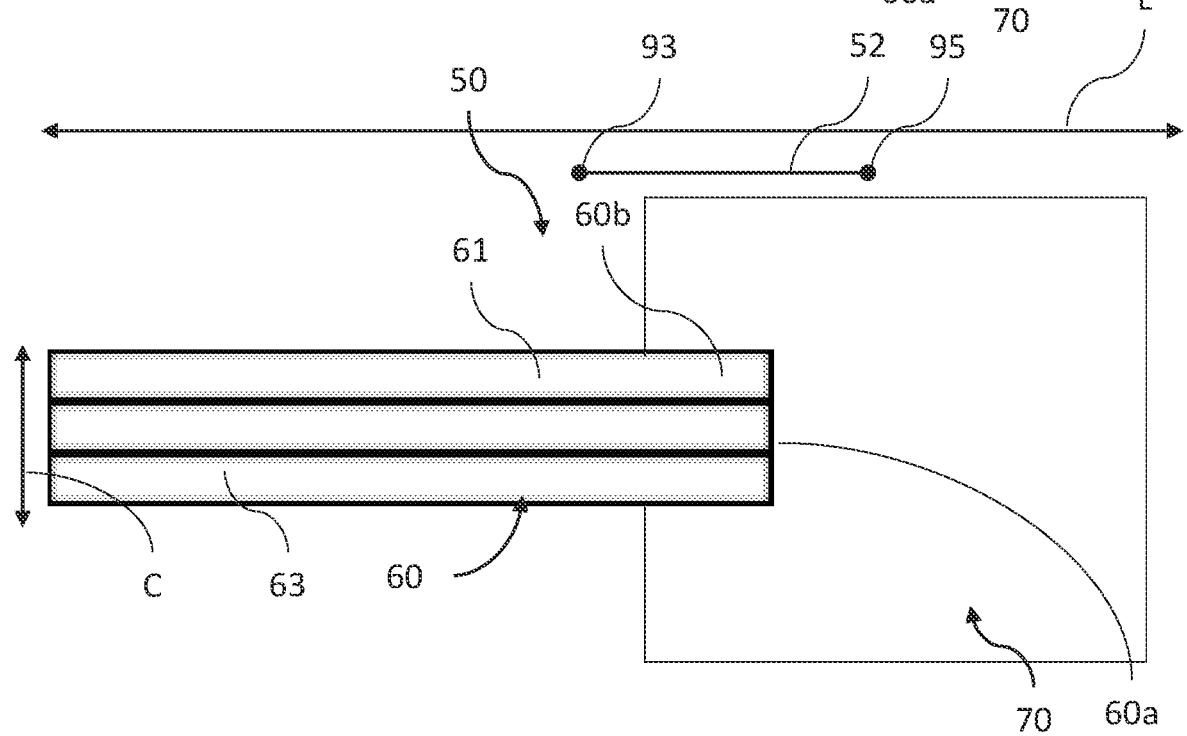
FIG. 4b is a schematic diagram illustrating a top view of another exemplary main laminate.

FIGS. 4a and 4b illustrate schematic configurations of the pultrusion portion 60 and the plurality of fibre-reinforced elements 70 of the main laminate 50.

In FIG. 4a, the pultrusion portion 60 comprises first distal, first proximal, second distal, and second proximal bottom pultrusion elements 61, 62, 63, 64 and further proximal intermediate and distal intermediate bottom pultrusion elements which are arranged in three rows, i.e. a first, an intermediate, and a second row, and two columns, i.e. a proximal and a distal row. The first distal and first proximal bottom pultrusion elements 61, 62 are arranged end-to-end and in extension of each other along the spanwise direction L in the first row. The intermediate bottom pultrusion elements are arranged similarly in the intermediate row. The second distal and second proximal bottom pultrusion elements 63, 64 are similarly arranged in the third row. Each row is arranged side-by-side chordwise with adjacent rows. Each row has a proximal pultrusion element 62, 64 arranged in the proximal column and a distal pultrusion element 61, 63 arranged in the distal column. The width of the plurality of fibre-reinforced elements 70 in the chordwise direction C increases from the transition end 60a of the pultrusion portion 60 along the spanwise direction L until a desired width is reached.

The transition region 52 of the main laminate 55 is bounded by second and fifth locations 92, 95 along the spanwise extend of the main laminate 5. The chordwise width of the plurality of fibre-reinforced elements 70 adjacent to the transition region 52 at the fifth location 95 of main laminate 50 is wider the chordwise width of the pultrusion portion 60 adjacent to the transition region 52 at the third location 93 of the main laminate 50 and a maximum width of the pultrusion portion 60 as can be seen in FIGS. 4a-4b.

In FIG. 4b, the pultrusion portion 60 comprises first and second bottom pultrusion elements 61, 63 and further an intermediate bottom pultrusion element which are arranged in three rows, i.e. a first, an intermediate, and a second row, and a single column similarly to the arrangement in FIG. 4a but wherein the proximal and distal columns are combined in the single column. The plurality of fibre-reinforced elements 70 overlap with the pultrusion portion in the transition region 52 along the spanwise direction L. The plurality of fibre-reinforced elements has a constant width along the spanwise direction L.

Figure 5A:
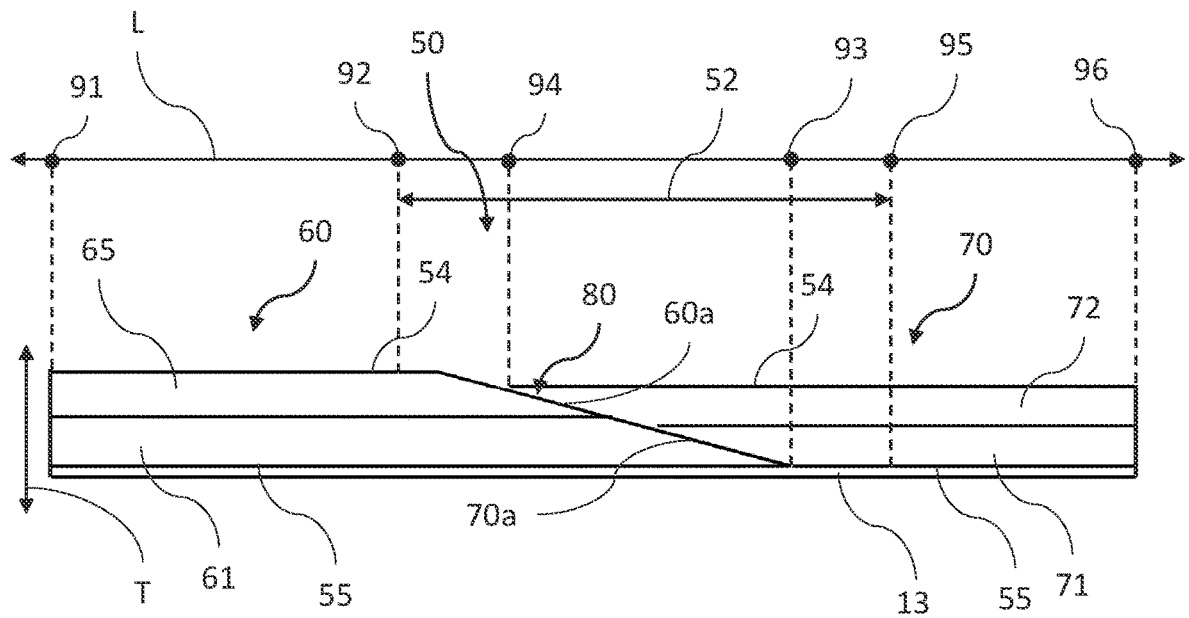
FIG. 5a is a schematic diagram illustrating a first spanwise cross-sectional view of an exemplary main laminate.
Figure 5B:
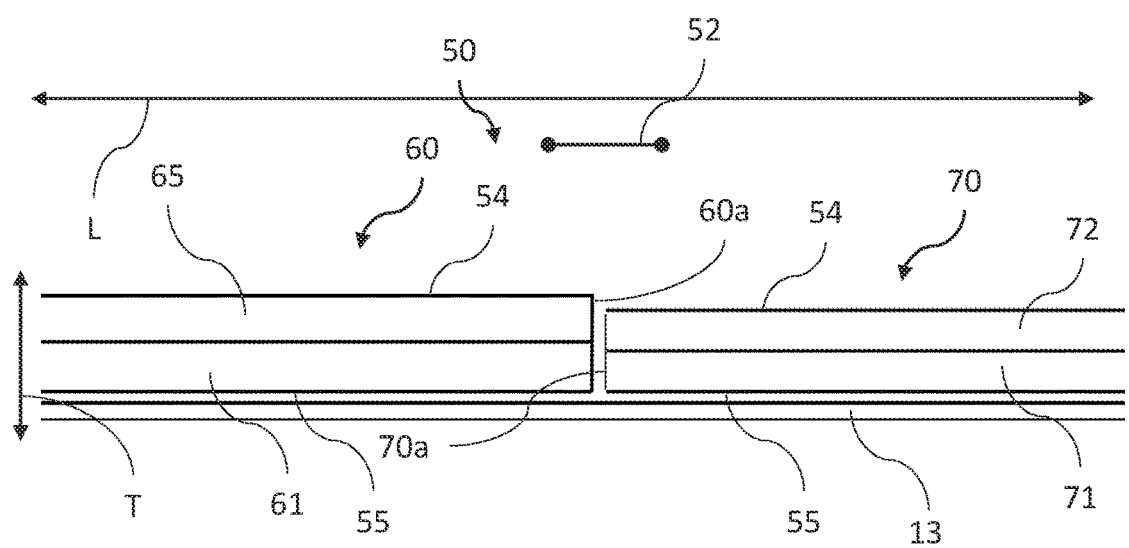
FIG. 5b is a schematic diagram illustrating a second spanwise cross-sectional view of an exemplary main laminate.

FIGS. 5a-5b shows a detail view of a schematic cross-section of two embodiments of a main laminate 50 in the span-thickness plane L, T showing the transition region 52 of the main laminate 50. The main laminate 50 is arranged on a shell 13 of a wind turbine blade. For both embodiments, in addition to the stacking of the fibre-forced elements 71, 72, the pultrusion portion 60 comprises a top pultrusion element 65 forming part of the top side 54 of the main laminate 50 and the pultrusion elements 61, 65 of the pultrusion portion 60 are stacked in the thickness direction T from the bottom pultrusion element 61 to the top pultrusion element 65.

In FIG. 5a, the joint between the transition end 60b of the pultrusion portion 60 and the transition end 70b of the plurality of fibre-reinforced elements 70 is a single spanwise scarf joint in which the transition end 60b of the pultrusion portion 60 tapers so that the bottom side 55 is longer than the top side 54 and the top side 54 of the top fibre-reinforced element 72 extends further than the bottom side 55 of the bottom fibre-reinforced element 71. The pultrusion portion 60 overlaps the plurality of fibre-reinforced elements 70 in the spanwise direction L.

The main laminate 50 comprises first, second, third, fourth, fifth, and sixth locations 91, 92, 93, 94, 95, 96 located along the spanwise extent of the main laminate 50. The first location 91 is located at the proximal end of the main laminate 50 and the sixth location 96 is located at the distal end of the main laminate 50.

The transition end 60a of the pultrusion portion 60 is located at the third location 93 and an opposite end, i.e. the proximal end, of the pultrusion portion 60 is located at the first location 91, and the second location 92 is located between the first and third locations 91, 93.

the transition end 70a of the plurality of fibre-reinforced elements 70 is located at the fourth location 94, and an opposite end, i.e. the distal end, of the plurality of fibre-reinforced elements 70 is located at the sixth location 96, and the fifth location 95 is located between the fourth and sixth locations 94, 96.

The second location 92 is located between the first and fourth locations 91, 94, and the fifth location 95 is located between the third and sixth locations 93, 96. The transition region 52 of the main laminate 55 is bounded by the second and the fifth locations 92, 95.

The thickness of the pultrusion portion 60 in the thickness direction T adjacent to the transition region 52 at the third location 93 of the main laminate 50 is thicker than the thickness of the plurality of fibre-reinforced elements 70 in the thickness direction T adjacent to the transition region 52 at the fifth location 95 of the main laminate 50 and the maximum thickness of the plurality of fibre-reinforced elements 70 as seen in the FIGS. 5a-5b.

In FIG. 5b, the joint between the transition end 60b of the pultrusion portion 60 and the transition end 70b of the plurality of fibre-reinforced elements 70 is a spanwise butt joint. The gap between transition ends 60b, 70b are shown for illustrative purposes, in practice the ends are arranged end-to-end without a gap. In this figure, the third and fourth position 93, 94 would, if shown, coincide as the joint is a butt joint.

Figure 6A:
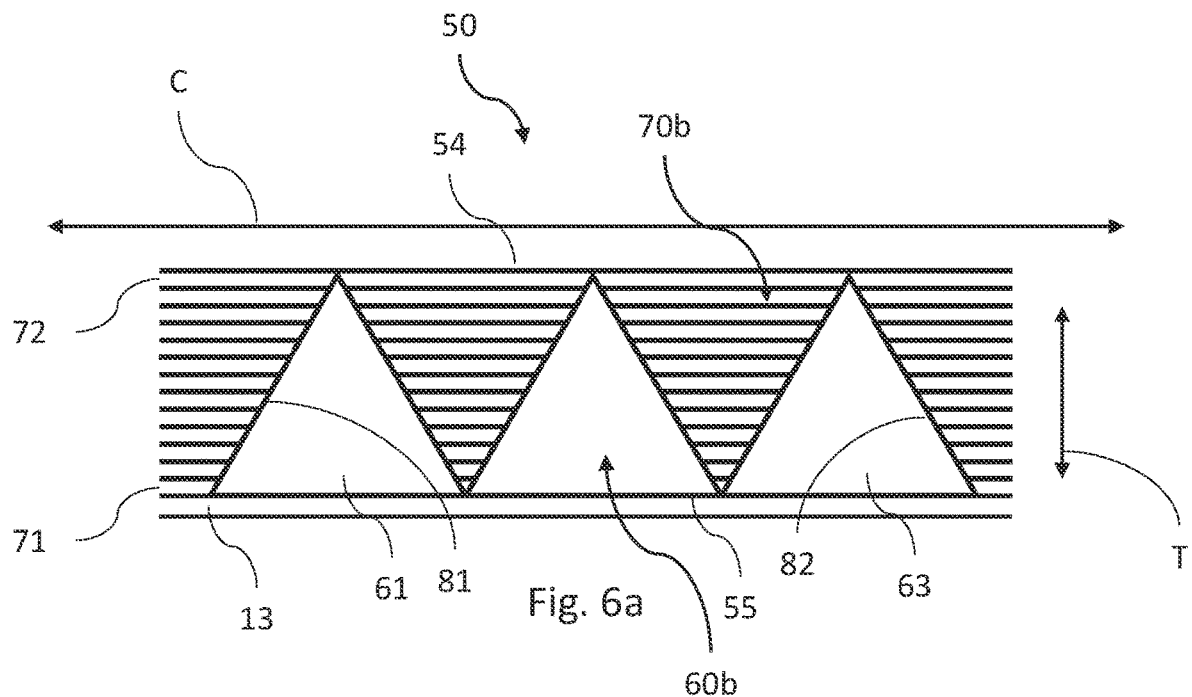
FIG. 6a is a schematic diagram illustrating a first chordwise cross-sectional view of an exemplary main laminate.
Figure 6B:
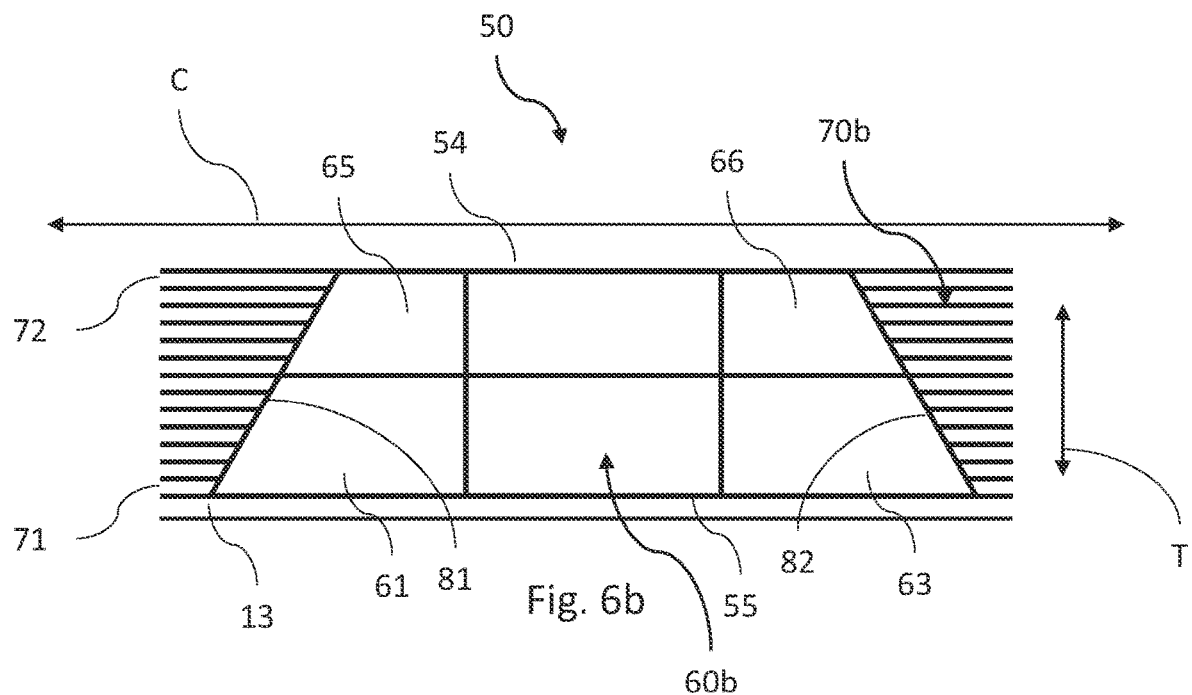
FIG. 6b is a schematic diagram illustrating a second chordwise cross-sectional view of an exemplary main laminate.

FIGS. 6a-6b shows a detail view of a schematic cross-section of two embodiments of a main laminate, e.g. as shown in FIGS. 4a-4b, in the chord-thickness plane C in the transition region 52, T arranged on a shell 13 of a wind turbine blade.

In FIG. 6a, a first, intermediate, and a second bottom pultrusion element 61, 63 are arranged in a bottom layer without further layers of elements stacked on top. The pultrusion elements each have a triangular cross-section. The plurality of fibre-reinforced elements 70 comprises a bottom and a top fibre-reinforced element 71, 72 and in this case eleven intermediate fibre-reinforced elements, which are arranged adjacent to and abutting the triangular sides of the pultrusion elements 61, 63 between the top and bottom side 54, 55 of the main laminate 50 joined by leading and trailing chordwise scarf joints 81, 82 on each chordwise side of the pultrusion portion 60.

In FIG. 6b, a bottom layer of pultrusion elements comprises the first, intermediate, and second bottom pultrusion elements 61, 63 and a top layer of pultrusion elements positioned on top of the bottom layer comprises a first, intermediate, and second top pultrusion elements 65, 66. In this embodiment, the pultrusion portion 60 has a isosceles trapezoid cross-sectional shape. The pultrusion portion 60 and the plurality of fibre-reinforced elements 70 are joined by leading and trailing chordwise scarf joints 81, 82 on each chordwise side of the pultrusion portion 60.

In the following a method of manufacturing a segmented wind turbine blade 10 comprising a main laminate 50 as seen in the figures is described. The method comprises the steps of:

providing:
  a mould 44 with a mould surface;
  a shell part 24 configured for providing the aerodynamic shape of the wind turbine blade 10 positioned on the mould surface of the mould 44,
  a pultrusion portion 60 including a plurality of pultrusion elements including a bottom pultrusion element 61 and a top pultrusion element 62 extending in the spanwise direction L to a transition end 60a, the pultrusion portion 60 having a transition portion 60b at the transition end 60a, and
  a plurality of fibre-reinforced elements 70 including bottom and top fibre-reinforced elements 71, 72 extending in the spanwise direction L to a transition end 70a, the plurality of fibre-reinforced elements 70 having a transition portion 70b at the transition end 70a;

positioning the bottom pultrusion element 61 and the bottom fibre-reinforced element 71 in extension of each other end-to-end on the shell part 24 of the wind turbine blade 10, so that the transition end 70a of bottom fibre-reinforced element 71 is adjacent to and faces the transition end 60a of the bottom pultrusion element 61 and so as to form continuous bottom side 55 of the pultrusion portion and the plurality of fibre-reinforced elements as seen in FIGS. 4a-4b;

stacking the plurality of pultrusion elements 61, 62 in the thickness direction T from the bottom pultrusion element 61 to the top pultrusion element 62;

stacking the plurality of fibre-reinforced elements 70 in the thickness direction T from the bottom fibre-reinforced element 71 to the top fibre-reinforced element 72 as seen in FIGS. 5a-5b and arranging any intermediate fibre-reinforced elements there in between as seen in FIGS. 6a-6b so that the transition end 70a of the plurality of fibre-reinforced elements 70 is positioned adjacent to the transition end 60a of the pultrusion portion 60;

sealing the shell part 24, the pultrusion portion 60 and the plurality of fibre-reinforced elements 70 in an airtight cavity;

evacuating air from the cavity to create a low-pressure atmosphere in the cavity;

infusing the pultrusion portion and the plurality of fibre-reinforced elements with a resin material, e.g. epoxy;

curing the shell part 24, the pultrusion portion 603 and the plurality of fibre-reinforced elements 70 thereby forming a scarf joint 80, 81, 82 between the transition portion 60b of the pultrusion portion 60 and the transition portion 70b of the plurality of fibre-reinforced elements 70;

attaching the shell part 24 and main laminate 50 to a corresponding blade shell part 26 with a corresponding main laminate to form a root blade segment by attaching the main laminate 50 to the corresponding main laminate via webs; and joining via a pin joint, the joint end 11a of the root blade segment 11 with a joint end 12a of a tip blade segment 12 via a pin joint to form a wind turbine blade 10.

LIST OF REFERENCES 2 wind turbine
4 tower
6 nacelle
8 hub
10 blade
11 root blade segment
11a joint end
12 tip blade segment
12a joint end
13 shell
14 blade tip
15 tip end
16 blade root
17 root end
18 leading edge
20 trailing edge
24 pressure side
26 suction side
30 root region
34 airfoil region
40 shoulder
44 proximal mould
46 distal mould
50 main laminate
L spanwise direction
C chordwise direction
51 proximal end
52 transition region
53 distal end
54 top side
55 bottom side
T thickness direction
60 pultrusion portion
60a transition end
60b transition portion
61 first distal bottom pultrusion element
62 first proximal bottom pultrusion element
63 second distal bottom pultrusion element
64 second proximal bottom pultrusion element
65 first distal top pultrusion element
66 second distal top pultrusion element
70 fibre-reinforced elements
70a transition end
70b transition portion
71 bottom fibre-reinforced element
72 top fibre-reinforced element
80 spanwise scarf joint
81 leading chordwise scarf joint
82 trailing chordwise scarf joint
91 first location
92 second location
93 third location
94 fourth location 95 fifth location
96 sixth location

The invention claimed is:

1. A main laminate forming a load carrying structure for a wind turbine blade, the main laminate extending in a spanwise direction from a proximal end through a transition region to a distal end, wherein the main laminate comprises:
   a top side configured for facing the interior of the wind turbine blade, a bottom side opposite of the top side, and a thickness direction extending between the top side and the bottom side;
   a pultrusion portion including a bottom pultrusion element extending in the spanwise direction from the proximal end to a pultrusion transition end located in the transition region of the main laminate, the pultrusion portion having a pultrusion transition portion at the pultrusion transition end, the bottom pultrusion element forming a first part of the bottom side of the main laminate; and
   a plurality of fibre-reinforced elements including bottom and top fibre-reinforced elements extending in the spanwise direction from the distal end to a fibre-reinforced element transition end located in the transition region of the main laminate, the plurality of fibre-reinforced elements having a fibre-reinforced element transition portion at the fibre-reinforced element transition end, the bottom fibre-reinforced element forming a second part of the bottom side of the main laminate, the plurality of fibre-reinforced elements being stacked in the thickness direction from the bottom fibre-reinforced element to the top fibre-reinforced element,
   wherein the pultrusion transition portion of the pultrusion portion and the fibre-reinforced element transition portion of the plurality of fibre-reinforced elements are connected by a first joint in the transition region of the main laminate, and
   wherein a chordwise side of the pultrusion transition portion of the pultrusion portion and a chordwise side of the fibre-reinforced element transition portion of the plurality of fibre-reinforced elements are connected by a second joint.

2. The main laminate according to claim 1, wherein the plurality of fibre-reinforced elements is in the form of at least one fibre-reinforced sheet, at least one fibre-reinforced ply, and/or at least one fibre-reinforced preform element.

3. The main laminate according to claim 1, wherein the pultrusion portion comprises a top pultrusion element forming part of the top side of the main laminate, the top pultrusion element and the bottom pultrusion element being stacked in the thickness direction from the bottom pultrusion element to the top pultrusion element.

4. The main laminate according to claim 1, wherein the bottom pultrusion element is a first bottom pultrusion element, and wherein the pultrusion portion comprises a second bottom pultrusion element arranged side-by-side chordwise with the first bottom pultrusion element.

5. The main laminate according to claim 1, wherein the bottom pultrusion element is a distal bottom pultrusion element, and wherein the pultrusion portion comprises a proximal bottom pultrusion element arranged end-to-end and in extension of the distal bottom pultrusion element.

6. The main laminate according to claim 1, wherein the first joint is a scarf joint.

7. The main laminate according to claim 6, wherein the scarf joint is a single scarf joint.

8. The main laminate according to claim 1, comprising first, second, third, fourth, fifth, and sixth locations located along a spanwise extent of the main laminate, the first location being located at the proximal end of the main laminate and the sixth location being located at the distal end of the main laminate, the transition region of the main laminate being bounded by the second location and the fifth location,
   wherein the pultrusion transition end of the pultrusion portion is located at the third location and an opposite end of the pultrusion portion is located at the first location, the second location is located between the first and third locations, and
   wherein the fibre-reinforced element transition end of the plurality of fibre-reinforced elements is located at the fourth location, and an opposite end of the plurality of fibre-reinforced elements is located at the sixth location, the fifth location is located between the fourth and sixth locations.

9. A wind turbine blade extending along a longitudinal axis from a root to a tip, the wind turbine blade comprising a root region and an airfoil region with the tip, the wind turbine blade comprising a pressure side, a suction side, and a chord line extending between a leading edge and a trailing edge, the wind turbine blade comprising a shell providing an aerodynamic shape of the wind turbine blade and a main laminate according to claim 1, the main laminate forming a load carrying structure of the wind turbine blade and the bottom side of the main laminate is positioned on the shell.

10. The wind turbine blade according to claim 9, wherein the proximal end of the main laminate is located in the root region or at the root of the wind turbine blade and the distal end of the main laminate is located in the airfoil region or at the tip of the wind turbine blade, and wherein the transition region of the main laminate is located in the airfoil region of the wind turbine blade.

11. The main laminate according to claim 1, wherein the second joint comprises a scarf joint.

12. A method for manufacturing a main laminate for a wind turbine blade, the main laminate extending in a spanwise direction from a proximal end through a transition region to a distal end and comprising a bottom side configured for facing a shell of the wind turbine blade, a top side configured for facing the interior of the wind turbine blade, and a thickness direction extending between the bottom side and the top side, the method comprising the steps of:
   providing:
      a pultrusion portion including a bottom pultrusion element extending in the spanwise direction to a pultrusion transition end, the pultrusion portion having a pultrusion transition portion at the pultrusion transition end, and
      a plurality of fibre-reinforced elements including bottom and top fibre-reinforced elements extending in the spanwise direction to a fibre-reinforced element transition end, the plurality of fibre-reinforced elements having a fibre-reinforced element transition portion at the fibre-reinforced element transition end;
   positioning the bottom pultrusion element and the bottom fibre-reinforced element in extension of each other, so that the fibre-reinforced element transition end of bottom fibre-reinforced element is adjacent to and faces the pultrusion transition end of the bottom pultrusion element;
   stacking the plurality of fibre-reinforced elements in the thickness direction from the bottom fibre-reinforced element to the top fibre-reinforced element;

curing the pultrusion portion and the plurality of fibre-reinforced elements thereby forming a first joint between the pultrusion transition portion of the pultrusion portion and the fibre-reinforced element transition portion of the plurality of fibre-reinforced elements; and connecting a chordwise side of the pultrusion transition portion of the pultrusion portion and a chordwise side of the fibre-reinforced element transition portion of the plurality of fibre-reinforced elements with a second joint.

13. The method according to claim 12, wherein the pultrusion portion is a plurality of pultrusion elements including the bottom pultrusion element and a top pultrusion element, the plurality of pultrusion elements extending in the spanwise direction to the pultrusion transition end of the pultrusion portion, and wherein the step of positioning the pultrusion portion comprises:

stacking the plurality of pultrusion elements in the thickness direction from the bottom pultrusion element to the top pultrusion element so that the pultrusion transition end of the pultrusion portion is positioned adjacent to the fibre-reinforced element transition end of the plurality of fibre-reinforced elements.

14. A method for manufacturing a wind turbine blade extending along a longitudinal axis from a root to a tip, the wind turbine blade comprising a root region and an airfoil region with the tip, the wind turbine blade comprising a pressure side, a suction side and a chord line extending between a leading edge and a trailing edge, the wind turbine blade comprising a shell providing the aerodynamic shape of the wind turbine blade and a main laminate forming a load carrying structure of the wind turbine blade, the method comprising the steps of:

providing:
  a shell configured for providing the aerodynamic shape of the wind turbine blade,
  a pultrusion portion including a bottom pultrusion element extending in the spanwise direction to a pultrusion transition end, the pultrusion portion having a pultrusion transition portion at the pultrusion transition end, and
  a plurality of fibre-reinforced elements including bottom and top fibre-reinforced elements extending in the spanwise direction to a fibre-reinforced element transition end, the plurality of fibre-reinforced elements having a fibre-reinforced element transition portion at the fibre-reinforced element transition end;

positioning the bottom pultrusion element and the bottom fibre-reinforced element in extension of each other on the shell of the wind turbine blade, so that the fibre-reinforced element transition end of bottom fibre-reinforced element is adjacent to and faces the pultrusion transition end of the bottom pultrusion element;

stacking the plurality of fibre-reinforced elements in the thickness direction from the bottom fibre-reinforced element to the top fibre-reinforced element so that the pultrusion transition end of the pultrusion portion is positioned adjacent to the fibre-reinforced element transition end of the plurality of fibre-reinforced elements;

curing the pultrusion portion and the plurality of fibre-reinforced elements thereby forming a first joint between the pultrusion transition portion of the pultrusion portion and the fibre-reinforced element transition portion of the plurality of fibre-reinforced elements; and connecting a chordwise side of the pultrusion transition portion of the pultrusion portion and a chordwise side of the fibre-reinforced element transition portion of the plurality of fibre-reinforced elements with a second joint.

* * * * *